Figure 1:
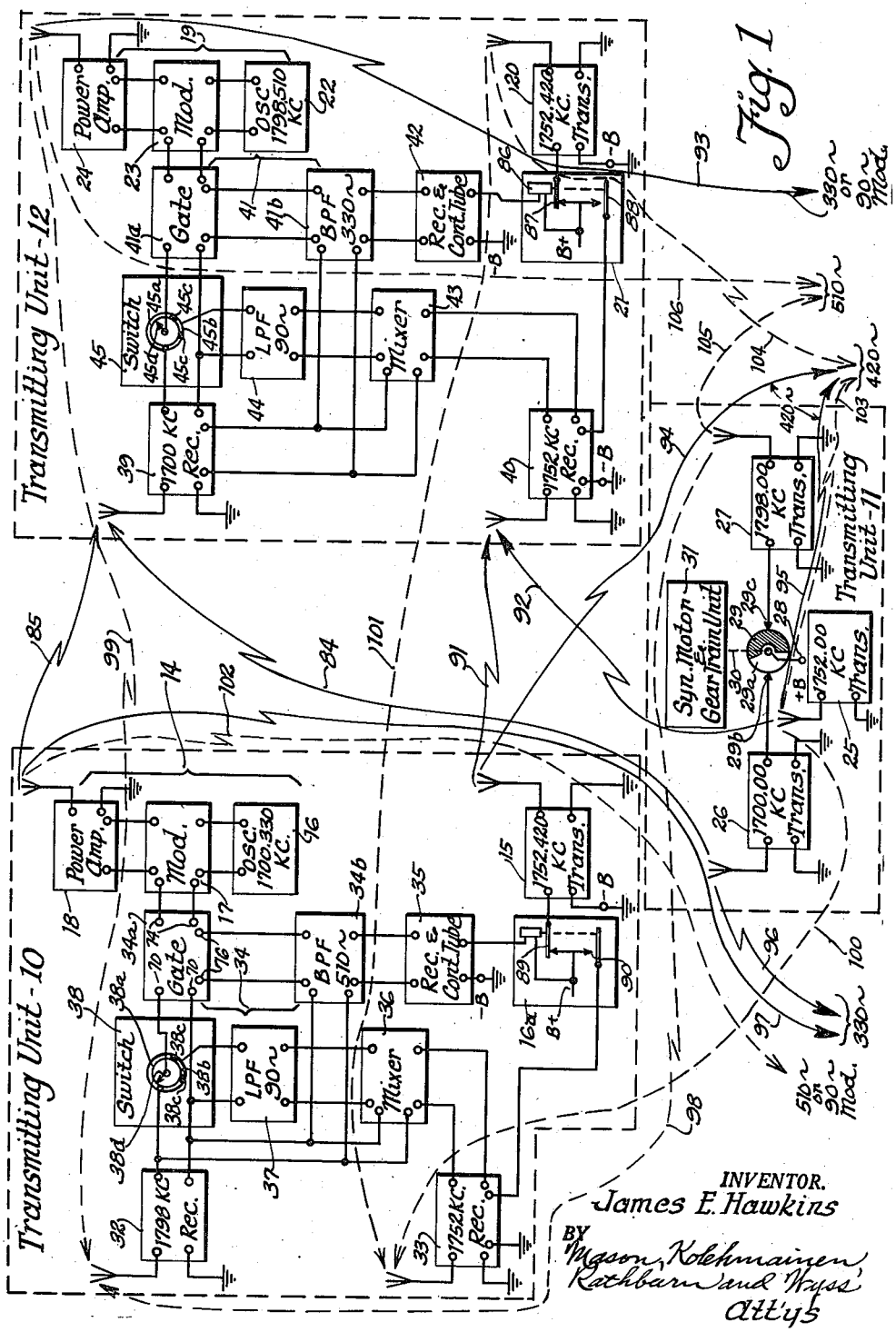

Sept. 15, 1953          J. E. HAWKINS          2,652,560
RADIO LOCATION SYSTEM

Filed Sept. 8, 1951                                5 Sheets-Sheet 3

INVENTOR.
James E. Hawkins
BY
Mason, Kolehmainen,
Rathburn and Wyss
Att'ys

Sept. 15, 1953

J. E. HAWKINS 2,652,560

RADIO LOCATION SYSTEM

Filed Sept. 8, 1951

5 Sheets-Sheet 4

INVENTOR.
James E. Hawkins
BY
Mason, Kolehmainen,
Rathburn and Wyss
Att'ys

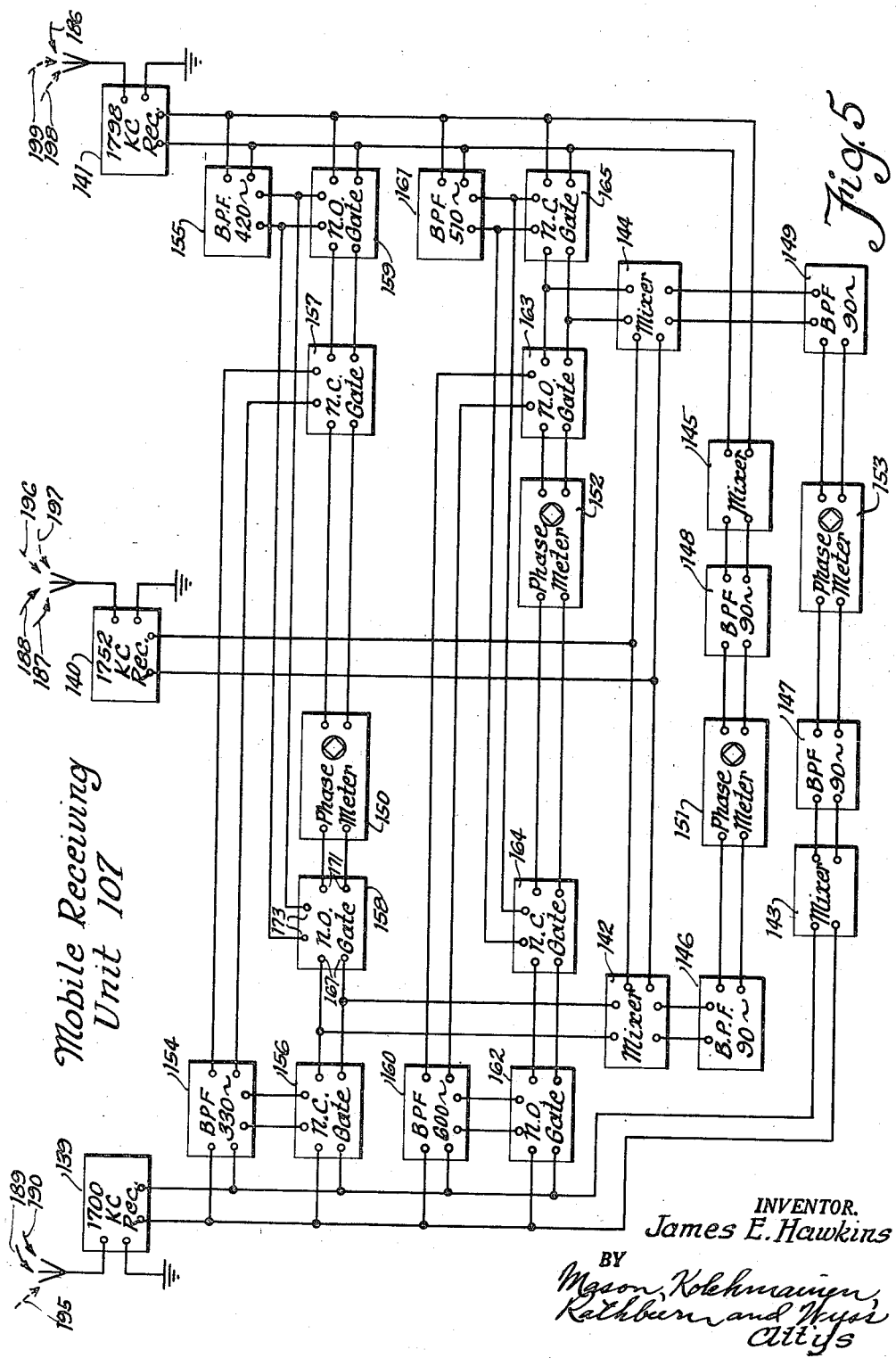

Patented Sept. 15, 1953

2,652,560

UNITED STATES PATENT OFFICE 2,652,560

RADIO LOCATION SYSTEM

James E. Hawkins, Tulsa, Okla., assignor to Seismograph Service Corporation, Tulsa, Okla., a corporation of Oklahoma Application September 8, 1951, Serial No. 245,753

35 Claims. (Cl. 343—105)

1

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line joining the pair of transmitters, these iso-phase lines may be spaced apart a distance equal to one-half of the wavelength of a wave having a frequency equal to the mean or average frequency of the radiated waves, and have diverging spacings at points on either side of this line, or in an improved system hereinafter referred to may be spaced apart a distance corresponding to so-called "phantom frequencies" representing the sum or difference of the mean or average frequencies. With this system arrangement, the position of a receiving point relative to a pair of hyperbolic iso-phase lines may be determined by measuring the phase relationship between continuous waves radiated from the pair of transmitters.

Since the point of location of the receiving point along the zone separating the two iso-phase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or alternatively, so to arrange the system that phase shifts between the radiated waves are compensated during the phase

2 comparing operation. Phase synchronization of the waves radiated from the plurality of transmitters presents an exceedingly difficult problem which has been the subject of considerable development work.

To obviate this problem, systems of the continuous wave hyperbolic type have been proposed (see Honore United States Patent No. 2,148,267), in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While the described arrangement for obviating the phase synchronization problem is entirely satisfactory, it entails the use of two carrier channels for the link transmitters in addition to the three or four channels taken up by the three or four survey channels in order to make up a complete system. An improved arrangement for eliminating the link transmitters without eliminating the functions thereof is disclosed and broadly claimed in Hawkins and Finn Patent No. 2,513,317, wherein a pair of transmitters are alternately operated as link transmitters and as position signal transmitters. Another problem encountered in the operation of continuous wave systems is that of eliminating ambiguity from the phase measurements which provide the desired position information. Thus, while the two phase measurements identify the position of the receiving station relative to two intersecting pairs of hyperbolic iso-phase lines, they do not indicate which pairs of lines the indications are related to. This means that in operating the system the geographic location of the receiving system must be known at the start of movement of the receiving system relative to the transmitting stations and, furthermore, that the successive wavelengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235 filed January 12, 1950, entitled Radio Location System and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, in so far as the spacing of the iso-phase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem a considerable number of transmitters and carrier channels are required and a number of transmitters and carrier channels are required and a number of narrow band pass filters must be employed to separate the various position indicating and reference signals, which adds to the expense and may cause phase shift difficulties unless the band pass filters are carefully selected and balanced. In a copending application entitled Radio Location System Serial No. 241,776, filed August 14, 1951, in the name of the present inventor and assigned to the same assignee, there is disclosed and claimed an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

In one embodiment of the invention disclosed in the latter copending application, narrow band pass filters are entirely eliminated, but a rather large number of different frequency carrier channels are required to provide the necessary position indicating signals and reference signal carriers, and in another embodiment a reduction in the number of frequencies requires the modulation of a plurality of reference signals on common carriers and the utilization of narrow band pass filters at the mobile receiving unit.

In accordance with the present invention a completely non-ambiguous system is obtained which while employing a minimum number of frequencies eliminates the use of narrow band pass filters in the signal circuits, eliminates or minimizes the modulation of more than one reference signal at a time on any carrier, and substantially isolates the phase meters from the signal circuits except during periods when the particular signals to be phase compared are being received at the mobile receiving unit thereby eliminating phase meter drift.

It is therefore an object of the present invention to provide an improved radio location system which is free of phase synchronization and phase shift difficulties and which combines economy of frequencies with precision position determination.

It is another object of the present invention to provide an improved radio location system of the continuous wave type which is free of phase synchronization difficulties, in which certain of the position indications obtained have sensitivities, in so far as the spacing of the iso-phase lines is concerned, which will be referred to hereinafter as phase sensitivity, different from the phase sensitivity normally determined by the frequencies of the radiated waves and in which the number of carrier channels employed is minimized.

It is a further object of the present invention to provide a radio position finding system of the character described in which non-ambiguous position indications are obtained.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient long range propagation.

It is likewise an object of the present invention to provide improved transmission systems for use in radio location systems of the above indicated character.

It is also an object of the invention to provide improved receiving equipment for use in radio location systems of the above indicated character.

Figure 2:
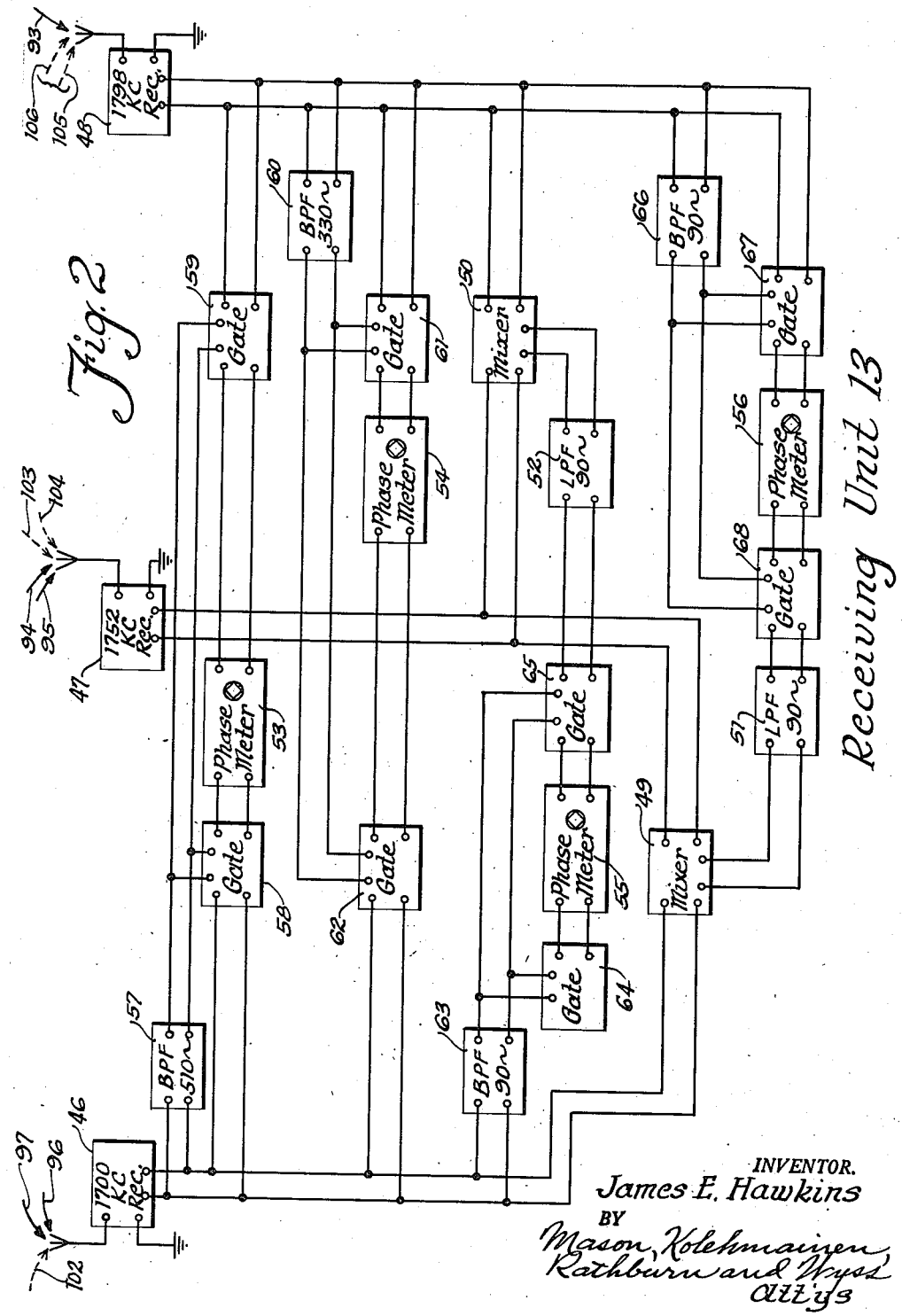
Figure 3:
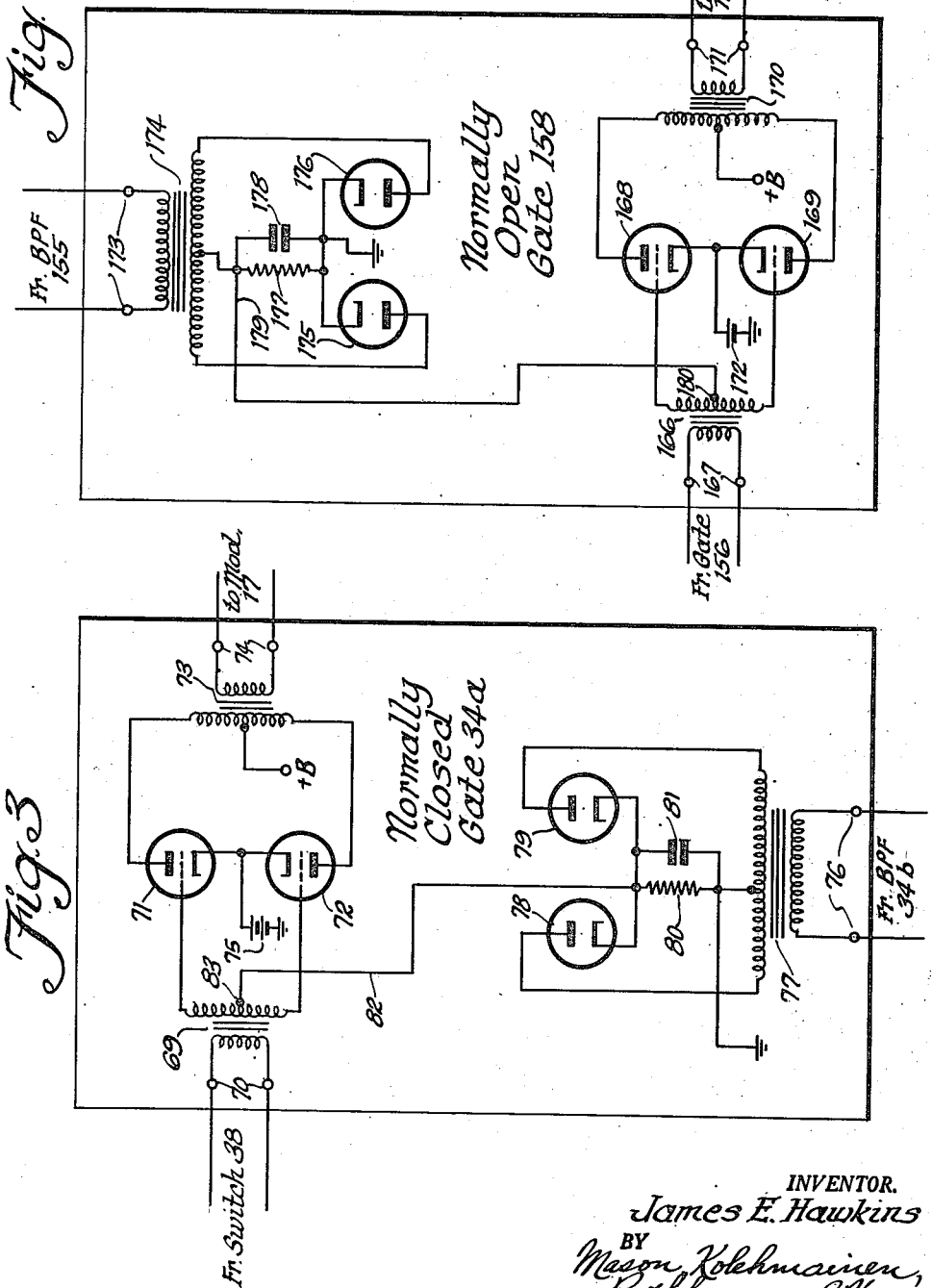
Figure 4:
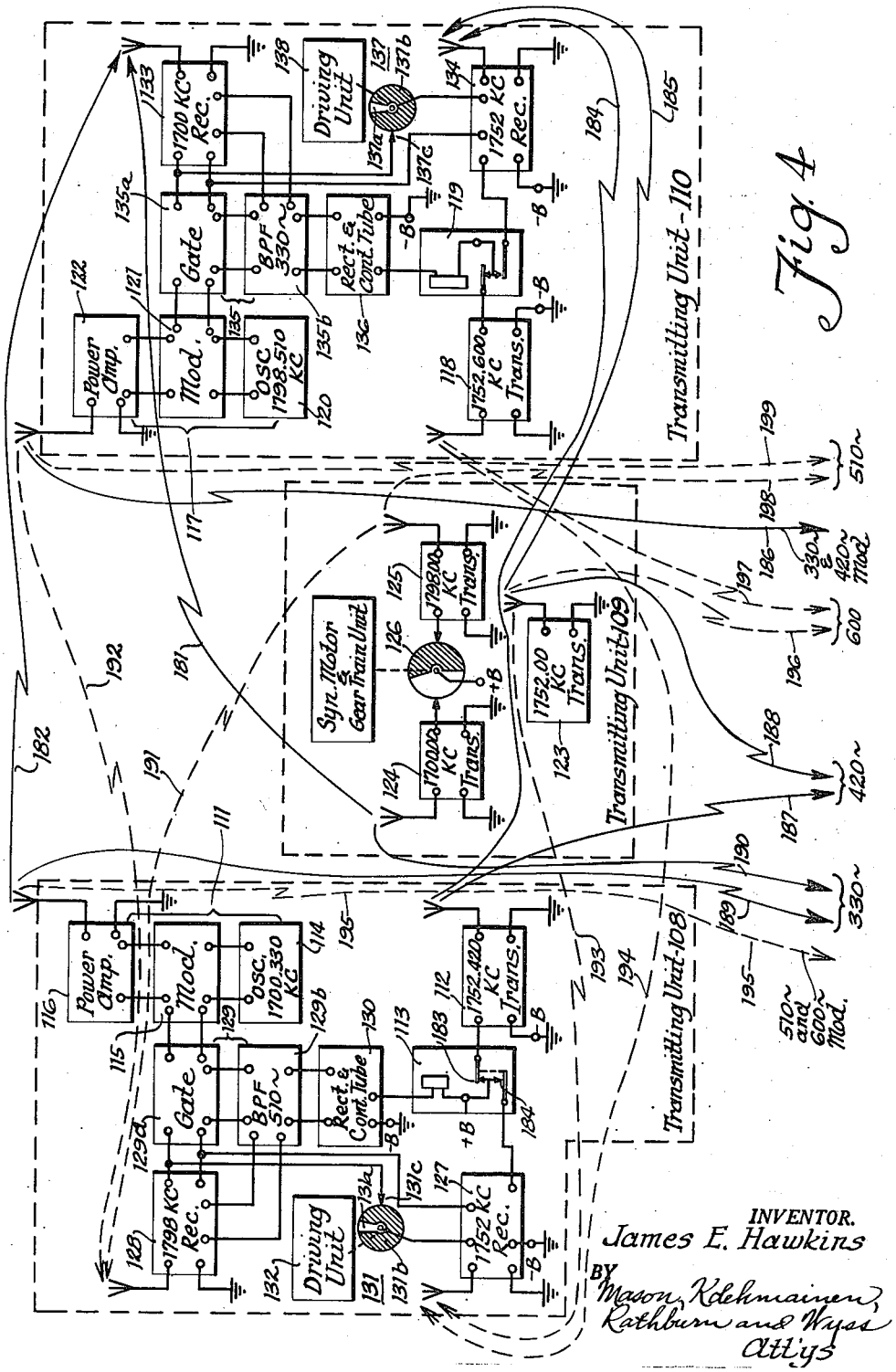

The invention, both as to its organization and method of operation, together with further objects and advantages thereof, will best be understood by reference to the specification taken in connection with the accompanying drawings in which:

Figs. 1 and 2 when taken together, constitute a diagrammatic representation of a three-foci position indicating system embodying the present invention, providing an unambiguous position fix by means of two sets of indications, each set including high and low phase sensitivity indications, Fig. 1 representing the transmitting end of the system and Fig. 2 representing the mobile receiving equipment;

Fig. 3 is a diagrammatic representation of a suitable normally closed gate circuit which may be employed in the equipment shown in Figs. 1 and 2;

Figs. 4 and 5 when taken together, constitute a diagrammatic representation of another form of three-foci position indicating system embodying the present invention, Fig. 4 representing the transmitting end of the system and Fig. 5 representing the mobile receiving equipment; and Fig. 6 is a diagrammatic representation of a suitable normally open gate circuit which may be employed in the receiving equipment shown in Fig. 5.

In the drawings, solid line and broken line arrows have been employed to indicate the receiving points of signal acceptance and the sources of the accepted signals during alternate periods in which certain of the transmitters are alternately operative in accordance with the arrangement disclosed in the aforesaid Patent No. 2,513,317 and as will be more fully described hereinafter.

Referring now to Figs. 1 and 2 of the drawings, the invention is illustrated as embodied in a three-foci hyperbolic continuous wave system for providing position information at a mobile receiving unit 13 (Fig. 2) which may be carried by a vessel or vehicle operating within the radius of transmission of a plurality of spaced transmitting units 10, 11 and 12. These units are preferably spaced apart approximately equal distances and are so positioned that the line joining the points of location of the units 10 and 11 is angularly related to the line joining the points of location of the units 11 and 12. As is described more fully hereinafter, the transmitting units 10 and 12 are equipped continuously to radiate a pair of position indicating signals in the form of carrier waves of different frequencies and to intermittently or alternately radiate a second pair of carrier waves of still different frequencies. On the other hand, the transmitting unit 11 is equipped to continuously radiate a carrier wave of another frequency and alternately to radiate an additional pair of position indicating signals in the form of carrier waves of still different frequencies.

Specifically, the transmitting unit 10 comprises a continuously operative transmitter 14 and a transmitter 15 which is adapted to be alternately rendered operative and inoperative by a suitable relay 16a. The transmitter 15 is adapted to radiate a continuous carrier wave at a frequency of 1752.420 kilocycles and the transmitter 14 consists of a carrier wave oscillator 16 adapted for operation at a frequency of 1700.330 kilocycles, a modulator 17 and a power amplifier 18 whereby the output of the transmitter 14 constitutes a continuous carrier wave, which, as is more fully described hereinafter, may have suitable modulation signals modulated thereon during certain periods of the transmitter operation. Similarly, the transmitting unit 12 comprises a continuously operative transmitter 19 and a transmitter 20 which is adapted to be alternately rendered operative and inoperative by a suitable relay 21. The transmitter 20 when rendered operative by the relay, radiates a continuous carrier wave at a frequency of 1752.420 kilocycles and the transmitter 19 includes a carrier wave oscillator 22 adapted for operation at a frequency of 1798.510 kilocycles, a modulator 23 and a power amplifier 24 whereby the output of the transmitter 19 constitutes a continuous carrier wave which, as is more fully described hereinafter, may have suitable modulation signals modulated thereon during certain periods of operation.

The transmitting unit 11 includes a continuously operative transmitter 25 adapted to radiate a continuous carrier wave at a frequency of 1752.00 kilocycles and a pair of additional transmitters 26 and 27 for respectively radiating additional carrier waves at frequencies of 1700.00 kilocycles and 1798.00 kilocycles together with switching means for alternately rendering one or the other of the transmitters 26 and 27 operative. In the arrangement illustrated, operation of either of the two transmitters 26 or 27 is accomplished by alternately feeding anode current to the electron discharge tubes of the respective transmitters from the positive terminal 28 of a suitable anode current source, not shown, through a commutating ring 29 which is shaft connected by means of a shaft 30 so as to be driven at a constant speed by a synchronous motor and gear train unit 31.

More specifically, the positive terminal 28 of the anode current source is connected to the conducting segment 29a of the commutating ring 29, which conductive segment spans slightly less than one-half of the circumference of the ring. The remainder of the ring 29 is composed of an insulating segment and at diametrically opposed points, suitable brushes 29b and 29c are provided, which engage the periphery of the ring. These brushes are respectively connected to the positive bus conductors of the respective transmitters whereby anode current is alternately delivered to the electron discharge tubes of the two transmitters. Since the conductive segment 29a represents slightly less than half the peripheral surface of the ring 29, it will be understood that a short off-period signal is provided between successive periods during which the transmitters 26 and 27 are alternately operative thus preventing simultaneous radiation of waves by both transmitters. The periodicity with which the two transmitters are alternately operated is, of course, dependent upon the speed of rotation of the commutating ring, and in the particular embodiment of the invention shown, the ring 29 is preferably driven at a speed of ten revolutions per second so that the transmitters 26 and 27 are alternately rendered operative at intervals of one twentieth of a second.

Referring again to the transmitting unit 10, this unit comprises, in addition to the transmitters 14 and 15, a pair of fixed tuned receivers 32 and 33, a frequency responsive gate means 34, a rectifier and control tube unit 35 for controlling the relay 16, a mixer or heterodyning means 36, a low pass filter 37 and a cyclically operable switch means 38. The gate means 34, in addition to a suitable gate circuit 34a which will be described more fully hereinafter in connection with Fig. 3, includes a 510 cycle band pass filter 34b. The switch means 38 comprises a commutating ring made up of a pair of conducting segments 38a and 38b which are separated by insulating segments 38c and adapted to be swept over by a rotating contact brush 38d, which as more fully explained hereinafter, is driven at a constant speed and functions alternately to supply reference signals of different frequency to the input terminals of the gate circuit. All of the above described equipment which goes to make up the transmitting unit 10 is connected as shown in Fig. 1 of the drawing, as will become clearly apparent in the description of the operation.

The transmitting unit 12 which is substantially identical with the transmitting unit 10 except for the frequencies at which various pieces of equipment operate, includes, in addition to the transmitters 19 and 20, a pair of fixed tuned receivers 39 and 40, a frequency responsive gate means 41, a rectifier and control tube unit 42, a mixer or heterodyning means 43, a low pass filter 44 and a cyclically operable switch means 45 which is identical with the switch means 38 at the transmitting unit 10. The gate means 41 includes, in addition to a suitable gate circuit 41a, a 330 cycle band pass filter 41b.

Referring now to Fig. 2, the mobile receiving unit 13 is shown as comprising a plurality of fixed tuned receivers 46, 47, and 48, of which the receivers 46 and 48 are of the amplitude modulation type, a pair of mixers or heterodyning means 49 and 50, a pair of low pass filters 51 and 52, and a plurality of phase measuring means or phase meters 53, 54, 55 and 56. Associated with each of the phase meters 53 to 56 are a plurality of normally closed frequency responsive gate means each of which includes a suitable sharply tuned narrow band pass filter and a plurality of gate circuits. Specifically, the gate means for the phase meter 53 includes a band pass filter 57 for controlling the gate circuits 58 and 59 in the input circuits of the phase meter. Similarly, the band pass filter 60 controls the gate circuits 61 and 62 for the phase meter 54, the band pass filter 63 controls the gate circuits 64 and 65 for the phase meter 55, and the band pass filter 66 controls the gate circuits 67 and 68 for the phase meter 56.

As indicated in the drawings, the receiver 46 is fixed tuned to a center frequency of 1700 kilocycles and is designed to accept the carrier waves radiated by either of the transmitters 14 or 26, whether modulated or unmodulated; the receiver 48 is fixed tuned to a center frequency of 1798 kilocycles and is designed to accept the carrier waves radiated by either of the transmitters 19 or 27, whether modulated or unmodulated; and the receiver 47 is fixed tuned to a center frequency of 1752 kilocycles and is designed to accept the carrier waves radiated by either of the transmitters 15, 20 or 25.

The various band pass filters employed in the transmitting units 10 and 12 and in the receiving unit 13 are sharply tuned audio filters which may be of any standard commercial construction, and the phase meters 53, 54, 55 and 56 may likewise be of standard construction although they are preferably of the type disclosed in Hawkins et al. Patent No. 2,551,211 issued May 1, 1951. As more fully described in the prior Hawkins et al. Patent No. 2,513,318 issued July 4, 1950, the use of sharply tuned audio filters for separating the various position indicating and reference signals, may cause phase shift difficulties due to differing frequency response characteristics of the filters. It will be observed, however, that in the system illustrated in Figs. 1 and 2, the sharply tuned audio filters are employed only in the control circuits for the gates rather than in the circuits for the signals which are to be phase compared. Various types of gate circuits may be employed in systems embodying the present invetnion so long as the gate circuits selected provide a distortionless wide pass band, and in Fig. 3 there is shown a suitable gate circuit which is identified, for example, as the gate circuit 34a at the transmitting unit 10. As shown in Fig. 3, the gate circuit includes a suitable input and isolating transformer 69, the primary winding of which is connected to the input terminals 70 of the gate circuit 34a and the secondary winding of which is connected to the grids of a pair of three-element electron discharge devices 71 and 72 which are connected in push-pull relation and biased for class A operation. The anode-cathode circuits of the tubes 71 and 72 are connected, as shown, to the primary winding of an output transformer 73, the secondary winding of which is connected to the output terminals 74 of the gate circuit 34a. Normally, the tubes 71 and 72 are biased beyond cutoff as, for example, by a battery 75 connected to the cathodes of the tubes so that no signal will pass from the input terminals to the output terminals of the gate circuit. The gate circuit, however, includes a pair of control terminals 76 which are connected for energization from the 510 cycle band pass filter 34b and, as shown in Fig. 3, these terminals are connected to the primary winding of a control transformer 77, the secondary winding of which is connected to a full wave rectifier comprising the two element tubes 78 and 79, the rectifier circuit also including a suitable cathode load resistor 80 and a by-pass condenser 81. As shown, one end of the load resistor 80 is connected by a suitable conductor 82 to a mid tap 83 on the secondary winding of the input transformer 69 which supplied the grids of the tubes 71 and 72. Thus, whenever a 510 cycle signal is supplied through the band pass filter 34b to the control terminals 76 of the gate circuit 34a, a rectified positive voltage will be applied to the grids of the tubes 71 and 72 so as to reduce the negative bias on the tubes to the proper value for class A operation and any signals supplied to the input terminals 70 will be conducted through the gate circuit without distortion to the output terminals 74.

Considering now the operation of the system shown in Figs. 1 and 2, when the commutating ring 29 is in the position shown in Fig. 1, anode current will be supplied to the transmitter 26 and the 1700.00 kilocycle wave radiated by the transmitter will, as indicated by the solid line arrow 84, be radiated to and accepted by the receiver 39 at the transmitting unit 12, together with the 1700.330 kilocycle wave radiated from the transmitter 14 at the transmitting unit 10, the latter wave being indicated by a solid line arrow 85. The beat frequency of 330 cycles between the two carrier waves accepted by the receiver 39 is reproduced in the audio frequency section of the receiver and delivered through the 330 cycle band pass filter 41b to the input terminals of the rectifier and control tube 42. The rectifier and control tube is of the type well known in the art and is effective when selectively energized and deenergized to close and open the energizing circuit for the winding of the control relay 21. As is apparent from the drawing, the relay 21 includes a pair of normally closed contacts 87 which normally complete the anode current circuit for the electron discharge tubes of the transmitter 20 and a pair of normally open contacts 88 which are effective when the relay 21 is operated to close the normally open anode current circuit for the electron tubes of the receiver 40. Accordingly, it will be apparent that by virtue of the production of the 330 cycle beat note signal at the receiver 39, the relay 21 is operated to render the transmitter 20 inoperative and to render the receiver 40 operative.

In addition to the above described control operation, the 330 cycle signal is transmitted through the band pass filter 41b to the control terminals of the gate circuit 41a so as to render the gate conductive. As shown in Fig. 1, the receiver 39 also supplies the 330 cycle signal produced therein to the switch means 45 which is connected between the receiver and the input terminals of the gate circuit 41a, and since the contact arm is being driven at a constant predetermined speed the 330 cycle signal will be supplied through the switch and the conductive gate circuit to the modulator 23 during the portion of each rotation of the contact arm that the arm is in contact with the conducting segment 45a. In addition to the transmitters 14 and 26, the transmitters 25 and 15 are operative during this portion of the cycle of operation, the contacts 89 of the control relay 16a at the unit 10 being closed so as to render the transmitter 15 operative, and the relay contacts 90 being open so as to render the receiver 33 at the unit 10 inoperative. The 1752.420 kilocycle carrier wave radiated by the transmitter 15 and the 1752.00 kilocycle carrier wave radiated by the transmitter 25 as respectively indicated by the solid line arrows 91 and 92, are radiated to and accepted by the receiver 40 at the unit 12 and the beat frequency of 420 cycles between the two carrier waves is reproduced in the audio frequency section of the receiver 40 and supplied, as indicated, to the input terminals of the mixer 43 which, as shown, is also supplied with the 330 cycle signal produced in the receiver 39. In the mixer 43 the two signals are heterodyned to produce a beat frequency difference signal of 90 cycles which is supplied through the low pass filter 44 to the switch 45. Accordingly during the portions of each rotation of the contact arm 45d that the arm engages the segment 45b, the 90 cycle signal will be supplied through the conductive gate circuit 41a to the modulator 23. Thus, it will be seen that during this cycle of operation of the system, the 1798.510 kilocycle carrier wave radiated by the transmitter 19 will be alternately modulated with the 330 cycle and 90 cycle beat frequency signals, and this carrier wave is radiated to the mobile receiving unit 13 as indicated by the solid line arrow 93 where it is accepted by the receiver 48. At the same time that the modulated carrier wave represented by the solid line arrow 93 is being received at the receiving unit, a pair of carrier waves from the transmitter 15 and the transmitter 25 are being radiated to and accepted by the receiver 47 at the receiving unit 13, as indicated by the solid line arrows 94 and 95, and similarly, as represented by the solid line arrows 96 and 97, the carrier waves radiated by the transmitter 14 and the transmitter 26, are being radiated to and accepted by the receiver 46 at the receiving unit 13.

At the receiving unit 13, the beat frequency of 330 cycles which exists between the carriers from the transmitters 14 and 26 represented by the solid line arrows 96 and 97, is reproduced in the audio frequency section of the receiver 46 and is supplied to the left hand or input terminals of the normally closed gate circuit 62. At the same time, the 330 cycle and 90 cycle reference signals which are modulated on the carrier wave radiated from the transmitter 19 and represented by the solid line arrow 93, will be reproduced in the receiver 48 and alternately appear at the output terminals of the receiver. During the periods when the contact arm 45d of the switch 45 is in engagement with the conducting segment 45a the 330 cycle reference signal will be supplied through the 330 cycle band pass filter 60 to the control terminals of the gate circuits 61 and 62 so as to render these gate circuits conductive. Since this 330 cycle reference signal is also supplied to the input terminals of the gate 61, the two 330 cycle signals will pass through the gates 61 and 62 to the opposite terminals of the phase meter 54, which phase meter functions to measure the phase relationship between the 330 cycle position indicating signal from the receiver 46 and the 330 cycle reference signal from the receiver 48, thereby providing a position indication of the mobile unit 13 relative to the transmitting units 10 and 11. Although the signals are supplied to the phase meter in the form of short pulses, these pulses will be of sufficient rapidity to cause a continuous indication on the phase meter.

As previously indicated, the phase sensitivity of the position indication thus obtained, is determined by the mean or average frequency of the radiated waves and since the mean or average frequency of the carrier waves radiated by the transmitters 14 and 26 is 1700.165, the iso-phase lines representative of the same phase relationship between the standing waves produced by the transmitters 14 and 26 along a line joining the units 10 and 11 would be spaced apart a distance of approximately 290 feet. This may be considered as the fine or high phase sensitivity position indication with respect to the transmitting units 10 and 11.

Simultaneously, with the above described energization of the phase meter 54 to provide this fine position indication, the receiver 47 at the unit 13 is effective to reproduce in the audio frequency section thereof the 420 cycle beat frequency difference between the waves radiated by the transmitters 15 and 25 so as to produce in the output of the receiver 47, a 420 cycle beat frequency signal which is supplied to the mixer or heterodyne means 49 which is also supplied, as shown, with the 330 cycle beat frequency signal developed at the receiver 46 as previously described. In the mixer 49, a 90 cycle position indicating signal is produced which passes through the low pass filter 51 to the left hand or input terminals of the gate 68. During the intervals in which the 90 cycle reference signal appears at the output of the receiver 48, i. e. when the contact arm 45d engages the conducting segment 45b, this 90 cycle reference signal passes through the band pass filter 66 to the control terminals of the gate circuits 67 and 68 so as to render these gates conductive. The input terminals of the gate circuit 67 are connected, as shown, to the output terminals of the receiver 48, and accordingly, whenever the gates 67 and 68 are rendered conductive the 90 cycle position indicating signal from the mixer 49 and the 90 cycle reference signal from the receiver 48 are supplied through the conducting gates to the phase meter 56 for phase comparison. As previously indicated, the phase sensitivity of the 90 cycle position indicating and reference signals is determined by the ratio between the mean frequencies of the waves transmitted by the pair of transmitters 14 and 26 from which the 330 cycle beat frequency signal was produced and the pair of transmitters 15 and 25 from which the 420 cycle beat frequency signal was produced. Since, with respect to each of these pairs of transmitters, the transmitter at the unit 10 is of higher frequency than the transmitter at the unit 11, thereby providing a phase shift of the same sense in each of the beat frequency signals, heterodyning the 330 cycle and 420 cycle beat frequency signals in the mixer 49, produces an output signal, the phase of which will vary by the difference between the 1700.165 kilocycle mean frequency of the transmitters 14 and 26 and the 1752.210 kilocycle means frequency of the transmitters 15 and 25. In other words, the phase sensitivity of the 90 cycle position indicating signal supplied to the phase meter 56 will correspond to a carrier signal of approximately 52.045 kilocycles which may be termed a phantom frequency equal to the difference between the real mean frequencies. Thus, when the 90 cycle position indicating signal is phase compared with the similarly produced 90 cycle reference signal supplied from the receiver 48, a much smaller number of lanes or 360° phase coincidences between the transmitting units 10 and 11 will be obtained and these iso-phase lines will be spaced apart along the line joining the units 10 and 11, a distance equal to one-half the wave length of a wave having a frequency of 52.045 kilocycles or a distance of approximately 9500 feet. It will thus be observed that the phase meters 54 and 56 provide two position indications of different sensitivity indicative of the position of the mobile receiving unit 13 relative to the transmitting units 10 and 11. The low phase sensitivity reading obtained from the phase meter 56 may thus be employed to establish within which of the pairs of iso-phase lines spaced 290 feet apart and indicated by the phase meter 54 the mobile receiving unit 13 is positioned.

It will be observed that during the above described transmitting interval, the phase meters 53 and 55 are completely isolated from the receiver output circuits by the associated gate circuits, there being no 90 cycle or 510 cycle signal present in the output circuit of the receiver 40, which is necessary to render these gates conductive through the band pass filters 57 and 63. While the switch 45 at the transmitting unit 12 may be operated at any desired speed, it is desirable to select a speed that will insure at least one pulse of each of the 330 cycle and 90 cycle signals during each half cycle of operation produced by the commutator ring 29 at the transmitting unit 11. For example, with the commutator ring 29 operating at ten revolutions per second as previously indicated, the switch 45 is preferably driven at some speed in excess of thirty revolutions per second. Furthermore, in order to cause the phase meters 54 and 56 to operate at substantially the same speeds in indicating position changes, the relative lengths of the conducting segments 45a and 45b of the switch 45 should be so proportioned that the period during which the 90 cycle reference signal is being transmitted bears to the period during which the 330 cycle reference signal is being transmitted the same ratio as the sensitivity of the coarse phase indication bears to the sensitivity of the fine phase indication, i. e. approximately 1 to 35.

At the end of the above described transmitting interval, the commutating ring 29 functions to interrupt the anode current circuits to the transmitter 26 thereby terminating operation of the phase meters 54 and 56 by reason of the fact that the 1700 kilocycle carrier wave from the transmitter 26 is no longer radiated to the receiver 46 at the mobile receiving unit 13 or to the receiver 39 at the transmitting unit 12 which causes the 330 cycle signals developed at these receivers to disappear. Disappearance of the 330 cycle signal at the receiver 39 deenergizes the control tube 42 and consequently relay 21 operates to its normal position in which the receiver 40 is rendered inoperative and the transmitter 28 is rendered operative through closure of its anode current circuits. Disappearance of the 330 cycle signal at the transmitting unit 12 is also effective to render the gate circuit 41a non-conductive so as to prevent further modulation of the carrier wave radiated by the transmitter 19. Although the 420 cycle signal developed at the receiver 47 at the receiving unit 13 will not be interrupted immediately that signal alone cannot effect operation of any of the phase meters. A short time interval after operation of the transmitter 26 is stopped, the commutating ring 29 functions to deliver anode current to the tubes of the transmitter 27 thus rendering this transmitter operative.

As soon as the transmitter 27 is rendered operative, the 1798.00 kilocycle carrier wave radiated by this transmitter together with the 1798.510 kilocycle carrier wave radiated by the transmitter 19 will be accepted at the receiver 32 of the transmitting unit 10, as indicated by the broken line arrows 98 and 99 respectively. This receiver 32 functions to produce in its output circuit the 510 cycle beat frequency difference between these carrier waves and this 510 cycle signal is supplied through the band pass filter 34b to the rectifier and control tube 35 so as to operate the relay 16a which accordingly operates, as previously indicated, to render the transmitter 15 inoperative and render the receiver 33 operative. In addition, the 510 cycle heat frequency signal is supplied from the band pass filter 34b to the gate circuit 34a thereby rendering the gate circuit conductive, and the 510 cycle beat frequency signal which is also supplied to the input terminals of the gate circuit is thus conducted through the gate and the cyclically operating switch 38 to the modulator 17 for modulation on the carrier wave radiated by the transmitter 14.

As soon as the receiver 33 at the transmitting unit 10 is rendered operative, it becomes effective to accept the 1752.00 kilocycle carrier wave radiated by the transmitter 25 and the 1752.420 kilocycle carrier wave radiated by the transmitter 20 at the transmitting unit 12, these carrier waves being respectively represented by the broken line arrows 100 and 101. The receiver 33 functions to produce in its output circuits the 420 cycle beat frequency signal representing the frequency difference between these last mentioned carriers and this 420 cycle signal is supplied to the mixer 36 which is also supplied with the 510 cycle signal produced at the receiver 32, and the mixer thereby functions to produce at its output circuits a 90 cycle beat note or difference frequency, which is selected by the low pass filter 37 and supplied through the switch means 38 and the conducting gate 34a to the modulator 17 for modulation on the carrier wave radiated by the transmitter 14.

Thus, the wave radiated by the transmitter 14, which is indicated by the broken line arrow 102, extending from the transmitter 14 to the receiver 46 at the mobile receiving unit 13 is alternately modulated with 510 cycle and 90 cycle reference signals. Simultaneously, with the production and transmission of these reference signals, the carrier waves radiated by the transmitters 25 and 28 are radiated to and accepted by the receiver 47 at the mobile receiving unit as represented by the broken line arrows 103 and 104, and the carrier signals respectively radiated by the transmitters 27 and 19 are radiated to and accepted by the receiver 48 at the mobile receiving unit as represented by the broken line arrows 105 and 106 respectively.

At the receiving unit 13, the operation is identical with that described in connection with the first half cycle of operation except that the phase meters 53 and 55 are now operated to provide fine and coarse position indications of the position of the mobile receiving unit 13 relative to the transmitting units 11 and 12. Thus, the 510 cycle and 90 cycle modulation components are alternately reproduced at the receiver 46 and the 510 cycle signal is supplied through the band pass filter 57 to the control terminals of the gates 58 and 59 thereby rendering the gates conductive during the periods when the 510 cycle signal is being transmitted, and at the same time a difference frequency of 510 cycles is produced at the receiver 48. The two 510 cycle signals pass through the conducting gates to the phase meter 53 for phase comparison. Thus, a fine or high phase sensitivity position indication is produced having isophase lines spaced apart approximately 275 feet. At the same time, the 420 cycle difference frequency signal produced at the receiver 47 is supplied to the mixer 50 which is also supplied from the receiver 48 with the 510 cycle signal developed at that receiver. At the mixer 50, the two signals are heterodyned to provide a 90 cycle difference frequency position indicating signal which passes through the low pass filter 52 to the gate 65. During the periods when the 90 cycle reference signal is being reproduced in the receiver 46, this signal passes through the band pass filter 63 and is effective to render the gates 64 and 65 conductive whereby the two 90 cycle signals are supplied to the phase meter 55 for phase comparison to provide a coarse position indication of the position of the mobile receiving unit relative to the transmitters 11 and 12 having a low phase sensitivity corresponding to iso-phase lines having a spacing of approximtaely 10,600 feet.

It will thus be seen that the phase meters 54 and 56 and the phase meters 53 and 55 function alternately to provide fine and coarse position indications at the mobile unit 13 which correspond to two pairs of intersecting sets of iso-phase lines of hyperbolic pattern, one pair comprising a hyperbolic grid in which the iso-phase lines are spaced approximately 280 feet apart along the iso-phase lines of the respective pairs of transmitters, and the other pair comprising similar patterns in which the iso-phase lines are spaced approximately 10,000 feet apart.

As previously indicated in the description of the operation of the switch means 45 at the transmitting unit 12, the switch means 38 at the unit 10 may be operated at any desired speed and the ratio of the lengths of the conducting segments 38b and 38a should preferably be about 1 to 35. Furthermore, it should be noted that it is not necessary to synchronize the operation of the switch means 38 and 45 either with respect to each other or with respect to the commutator ring 29.

It will be observed that in the above described embodiment of the invention, sharply tuned audio frequency band pass filters have been entirely eliminated from the signal circuits at both the transmitting units and at the receiving unit, thus obviating the above referred to problems of balancing out undesirable phase shifts that occur in such sharply tuned filters upon slight variations in temperature frequency, etc. Likewise it will be observed that narrow band pass filters are employed in this system only in the control circuits where phase shift problems are non-existent. All of the gate circuits as well as the low pass filters 37, 44, 51 and 52 have wide-pass distortionless characteristics which do not give rise to phase shift problems.

The system of Figs. 1 and 2 functions to provide accurate unambiguous position fixes, and among other desirable characteristics of the system is the fact that none of the signals applied to the phase meters pass through narrow band pass filters, the latter being required to operate the gate circuits only, and the fact that only one signal at a time is transmitted as a modulation component. Furthermore, the filters, gate means, and time sharing facilities prevent any signals from being applied to the phase meters except those required for operation of the phase meters thereby reducing or eliminating phase meter drift.

In the embodiment of the invention shown in Figs. 4 and 5, a similar position determining system is provided in which somewhat different time sharing, heterodyning and gating arrangements are employed. Referring now specifically to Figs. 4 and 5, the invention is illustrated as embodied in a three-foci hyperbolic continuous wave system for providing position information at a mobile receiving unit 107 (Fig. 5) which may be carried by a vessel or behicle operating within the radius of transmission of a plurality of spaced transmitting units 108, 109 and 110. These units are preferably spaced apart similarly to the units 10, 11 and 12 of Figs. 1 and 2. As is described more fully hereinafter, the transmitting units 108 and 110 are equipped continuously to radiate a pair of position indicating signals in the form of carrier waves of different frequencies and to intermittently or alternately radiate a second pair of carrier waves of still different frequencies. On the other hand, the transmitting unit 109 is equipped to continuously radiate a carrier wave of another frequency and alternately to radiate an additional pair of position indicating signals in the form of carrier waves of still different frequencies.

Specifically, the transmitting unit 108 comprises a continuously operative transmitter 111 and a transmitter 112 which is adapted to be alternately rendered operative and inoperative by a suitable relay 113. The transmitter 112 is adapted to radiate a continuous carrier wave at a frequency of 1752.420 kilocycles and the transmitter 111 consists of a carrier wave oscillator 114 adapted for operation at a frequency of 1700.330 kilocycles, a modulator 115 and a power amplifier 116 whereby the output of the transmitter 111 constitutes a continuous carrier wave, which, as is more fully described hereinafter, may have suitable modulation signals modulated thereon during certain periods of the transmitter operation. Similarly, the transmitting unit 110 comprises a continuously operative transmitter 117 and a transmitter 118 which is adapted to be alternately rendered operative and inoperative by a suitable relay 119. The transmitter 118 when rendered operative by the relay, radiates a continuous carrier wave at a frequency of 1752.600 kilocycles and the transmitter 117 includes a carrier wave oscillator 120 adapted for operation at a frequency of 1798.510 kilocycles, a modulator 121 and a power amplifier 122 whereby the output of the transmitter 117 constitutes a continuous carrier wave which, as is more fully described hereinafter, may have suitable modulation signals modulated thereon during certain periods of operation.

The transmitting unit 109 is identical in construction and operation with the transmitting unit 11 of Fig. 1 and, as shown, includes a continuously operative transmitter 123 and a pair of alternately operative transmitters 124 and 125 controlled by a continuously driven commutating ring 126.

Referring again to the transmitting unit 108, this unit comprises, in addition to the transmitters 111 and 112, a pair of fixed tuned receivers 127 and 128, a frequency responsive gate means 129, a rectifier and control tube unit 130 for controlling the relay 113, and a cyclically operable switch means 131. The gate means 129, in addition to a suitable gate circuit 129a which may be identical with the gate circuit 34a shown in Fig. 3, includes a 510 cycle band pass filter 129b. The switch means 131 comprises a commutating ring made up of a narrow conducting segment 131a and an insulating segment 131b adapted to be driven at a constant speed by a suitable driving unit 132 and which cooperates with a contact brush 131c intermittently to supply signals from the receiver 127 to the input terminals of the gate circuit. All of the above described equipment which goes to make up the transmitting unit 108 is connected as shown in Fig. 4 of the drawing, as will become clearly apparent in the description of the operation.

The transmitting unit 110 which is substantially identical with the transmitting unit 108 except for the frequencies at which various pieces of equipment operate, includes, in addition to the transmitters 117 and 118, a pair of fixed tuned receivers 133 and 134, a frequency responsive gate means 135, a rectifier and control tube unit 136, and a cyclically operable switch means 137 which is identical with the switch means 131 at the transmitting unit 108 and is driven by a driving unit 138. The gate means 135 includes, in addition to a suitable gate circuit 135a, a 330 cycle band pass filter 135b.

Referring now to Fig. 5, the mobile receiving unit 107 is shown as comprising a plurality of fixed tuned receivers 139, 140 and 141, of which the receivers 139 and 141 are of the amplitude modulation type, a plurality of mixers or heterodyning means 142, 143, 144 and 145, a plurality of 90 cycle band pass filters 146, 147, 148 and 149, and a plurality of phase measuring means or phase meters 150, 151, 152 and 153. Associated with each of the phase meters 150 and 151 are a plurality of normally closed frequency responsive gate means each of which includes a suitable sharply tuned narrow band pass filter and a plurality of gate circuits. Specifically, the gate means for the phase meter 150 includes a pair of band pass filters 154 and 155 for respectively controlling the normally closed gate circuits 156 and 157 and the normally open gate circuits 158 and 159 in the input circuits of the phase meter. Similarly, the band pass filters 160 and 161 respectively control the normally open gate circuits 162 and 163 and the normally closed gate circuits 164 and 165 for the phase meter 152.

As indicated in the drawings, the receiver 139 is fixed tuned to a center frequency of 1700 kilocycles and is designed to accept the carrier waves radiated by either of the transmitters 111 or 124, whether modulated or unmodulated; the receiver 141 is fixed tuned to a center frequency of 1798 kilocycles and is designed to accept the carrier waves radiated by either of the transmitters 117 or 125, whether modulated or unmodulated; and the receiver 140 is fixed tuned to a center frequency of 1752 kilocycles and is designed to accept the carrier waves radiated by any of the transmitters 112, 123 or 118. The normally closed gate circuits employed at the receiving unit 107 may be of the type shown in Fig. 3, and a suitable type of normally open gate circuit is shown in Fig. 6 and identified as the gate circuit 158, for example. As shown in Fig. 6, the gate circuit includes a suitable input and isolating transformer 166, the primary winding of which is connected to the input terminals 167 of the gate circuit 158 and the secondary winding of which is connected to the grids of a pair of three-element electron discharge devices 168 and 169 which are connected in push-pull relation and biased for class A operation. The anode-cathode circuits of the tubes 168 and 169 are connected, as shown, to the primary winding of an output transformer 170, the secondary winding of which is connected to the output terminals 171 of the gate circuit. Normally, the tubes 168 and 169 are biased for class A operation as, for example, by a battery 172 connected to the cathodes of the tubes, and consequently, signals will pass from the input terminals to the output terminals of the gate circuit. The gate circuit, however, includes a pair of control terminals 173 which are connected for energization from the 420 cycle band pass filter 155 and, as shown in Fig. 6, these terminals are connected to the primary winding of a control transformer 174, the secondary winding of which is connected to a full wave rectifier comprising the two-element tubes 175 and 176, the rectifier circuit also including a suitable cathode load resistor 177 and a bypass condenser 178. As shown, one end of the load resistor 177 is connected by a suitable conductor 179 to a mid tap 180 on the secondary winding of the input transformer 174 which supplies the grids of the tubes 168 and 169. Thus, whenever a 420 cycle signal is supplied through the band pass filter 155 to the control terminals 173 of the gate circuit 158, a rectified negative voltage will be applied to the grids of the tubes 168 and 169 so as to increase the negative bias on the tubes to a value beyond cut-off, thereby preventing the passage through the gate circuit of signals supplied to the input terminals.

Considering now the operation of the system shown in Figs. 4 and 5, when the commutating ring 126 is in the position shown in Fig. 4, anode current will be supplied to the transmitter 124 and the 1700.00 kilocycle wave radiated by the transmitter will, as indicated by the solid line arrow 181, be radiated to and accepted by the receiver 133 at the transmitting unit 110, together with the 1700.330 kilocycle wave radiated from the transmitter 111 at the transmitting unit 108, the latter wave being indicated by a solid line arrow 182. The beat frequency of 330 cycles between the two carrier waves accepted by the receiver 133 is reproduced in the audio frequency section of the receiver and delivered through the 330 cycle band pass filter 135b to the input terminals of the rectifier and control tube 136. As will be apparent from the description of the control tube 42 and the associated relay 21 of Fig. 1, production of the 330 cycle beat note signal at the receiver 133 is effective to cause operation of the relay 119 to render the transmitter 118 inoperative and to render the receiver 134 operative.

In addition to the above described control operation, the 330 cycle signal is transmitted through the band pass filter 135b to the control terminals of the gate circuit 135a so as to render the gate conductive and since the 330 cycle signal is also supplied to the input terminals of the gate circuit the 330 cycle signal will be supplied to the modulator 121 for modulation on the carrier wave radiated by the transmitter 117. In addition to the transmitters 111 and 124, the transmitters 112 and 123 are operative during this portion of the cycle of operation, the contacts 183 of the control relay 113 at the unit 108 being closed so as to render the transmitter 112 operative, and the relay contacts 184 being open so as to render the receiver 127 at the unit 108 inoperative. The 1752.420 kilocycle carrier wave radiated by the transmitter 112 and the 1752.00 kilocycle carrier wave radiated by the transmitter 123 as respectively indicated by the solid line arrows 184 and 185, are radiated to and accepted by the receiver 134 at the unit 110 and the beat frequency of 420 cycles between the two carrier waves is reproduced in the audio frequency section of the receiver 134 and supplied, as indicated, to the input terminals of the conductive gate 135c through the conductive segment 137a and the brush contact 137c of the cyclically operating switch means. Accordingly, during the portions of each rotation of the commutator ring 137 that the contact 137c engages the segment 137a the 420 cycle signal will be supplied through the conductive gate circuit to the modulator 121. Thus, it will be seen that during this cycle of operation of the system, the 1798.510 kilocycle carrier wave radiated by the transmitter 117 will be constantly modulated with a 330 cycle beat frequency signal and will be intermittently modulated with the 420 cycle beat frequency signal, and this carrier wave is radiated to the mobile receiving unit 107 as indicated by the solid line arrow 186 where it is accepted by the receiver 141. At the same time that the modulated carrier wave represented by the solid line arrow 186 is being received at the receiving unit, a pair of carrier waves from the transmitter 112 and the transmitter 123 are being radiated to and accepted by the receiver 140 at the receiving unit 107, as indicated by the solid line arrows 187 and 188, and similarly, as represented by the solid line arrows 189 and 190, the carrier waves radiated by the transmitter 111 and the transmitter 124, are being radiated to and accepted by the receiver 139 at the receiving unit 107.

At the receiving unit 107, the beat frequency of 330 cycles which exists between the carriers from the transmitters 111 and 124 represented by the solid line arrows 189 and 190, is reproduced in the audio frequency section of the receiver 139 and is supplied through the band pass filter 154 to the control terminals of the normally closed gate circuits 156 and 157 so as to render these gates conductive. At the same time, the 330 cycle and 420 cycle reference signals which are modulated on the carrier wave radiated from the transmitter 117 and represented by the solid line arrow 186, will be reproduced in the receiver 141 and the 330 cycle signal will appear continuously at the output terminals of the receiver. During periods when only the 330 cycle signal is present this 330 cycle reference signal will be supplied through the normally open gate circuit 159 and the normally closed gate circuit 157 which is now conductive to the right hand terminals of the phase meter 150. Since the 330 cycle position signal developed at the receiver 139 is also supplied to the input terminals of the gate 156, this signal will pass through the gates 156 and 158 to the opposite terminals of the phase meter 150, which phase meter functions to measure the phase relationship between the 330 cycle position indicating signal from the receiver 139 and the 330 cycle reference signal from the receiver 141, thereby providing a position indication of the mobile unit 107 relative to the transmitting units 108 and 109. This position indication, as will be apparent from the description of the system of Figs. 1 and 2, may be considered as the fine or high phase sensitivity position indication with respect to the transmitting units 108 and 109, having iso-phase lines spaced approximately 290 feet apart along a line joining these transmitters.

Simultaneously, with the above described energization of the phase meter 150 to provide this fine position indication, the receiver 140 at the unit 107 is effective to reproduce in the audio frequency section thereof the 420 cycle beat frequency difference between the waves radiated by the transmitters 112 and 123 so as to produce in the output of the receiver 140, a 420 cycle beat frequency signal which is supplied to the mixer or heterodyne means 142 which is also supplied through the gate circuit 156 with the 330 cycle beat frequency signal developed at the receiver 139 as previously described. In the mixer 142, a 90 cycle position indicating signal is produced which passes through the band pass filter 146 to the left hand terminals of the phase meter 151.

During the intervals in which both the 420 cycle and the 330 cycle reference signals appear at the output of the receiver 141, i. e. when the contact arm 137c engages the conducting segment 137a, these two reference signals will be supplied to the mixer 145 which thereupon functions to produce a 90 cycle reference signal, and this 90 cycle reference signal passes through the band pass filter 148 to the right hand terminals of the phase meter 151 for phase comparison with the 90 cycle position indicating signal.

The 420 cycle reference signal produced in the receiver 141 in addition to its above described function, is also employed for the purpose of isolating the fine indication phase meter 150 during the periods when the 420 cycle signal is present at the output of the receiver 141. Thus, this 420 cycle signal is supplied through the band pass filter 155 to the control terminals of the normally open gates 158 and 159 to render these gates non-conductive as described in connection with Fig. 6. In the absence of the gates 158 and 159, improper operation of the phase meter 150 would be caused by the 420 cycle reference signal during the intermittent periods when the coarse indication phase meter 151 is being energized.

As explained in connection with Figs. 1 and 2, the phase sensitivity of the 90 cycle position indicating signal supplied to the phase meter 151 will correspond to a carrier signal of approximately 52.045 kilocycles which may be termed a phantom frequency equal to the difference between the real mean frequencies. Thus, when the 90 cycle signals are phase compared, a much smaller number of lanes or 360° phase coincidences between the transmitting units 108 and 109 will be obtained and these iso-phase lines will be spaced apart along the line joining the units 108 and 109, a distance equal to one-half the wave length of a wave having a frequency of 52.045 kilocycles or a distance of approximately 9500 feet. It will thus be observed that the phase meters 150 and 151 provide two position indications of different sensitivity indicative of the position of the mobile receiving unit 107 relative to the transmitting units 108 and 109. The low phase sensitivity reading obtained from the phase meter 151 may thus be employed to establish within which of the pairs of iso-phase lines spaced 290 feet apart and indicated by the phase meter 150 the mobile receiving unit 107 is positioned. Furthermore, in order to cause the phase meters 150 and 151 to operate at substantially the same speeds in indicating position changes, the conducting segment 137a of the commutator ring should be so proportioned that the "on" time of the 420 cycle reference signal bears to the "off" time of this signal the same ratio as the sensitivity of the coarse phase indication bears to the sensitivity of the fine phase indication, i. e. approximately 1 to 35.

At the end of the above described transmitting interval, the commutating ring 126 functions to interrupt the anode current circuits to the transmitter 124 thereby terminating operation of the phase meters 150 and 151 by reason of the fact that the 1700 kilocycle carrier wave from the transmitter 124 is no longer radiated to the receiver 139 at the mobile receiving unit 107 or to the receiver 133 at the transmitting unit 110 which causes the 330 cycle signals developed at these receivers to disappear. Disappearance of the 330 cycle signal at the receiver 133 deenergizes the control tube 136 and consequently, relay 119 operates to its normal position in which the receiver 134 is rendered inoperative and the transmitter 118 is rendered operative through closure of its anode current circuits. Disappearance of the 330 cycle signal at the transmitting unit 110 is also effective to render the gate circuit 135a non-conductive so as to prevent further modulation of the carrier wave radiated by the transmitter 117.

A short time interval after operation of the transmitter 124 is stopped, the commutating ring 126 functions to deliver anode current to the tubes of the transmitter 125 thus rendering this transmitter operative. As soon as the transmitter 125 is rendered operative, the 1798.00 kilocycle carrier wave radiated by this transmitter together with the 1798.510 kilocycle carrier wave radiated by the transmitter 117 will be accepted at the receiver 128 of the transmitting unit 108, as indicated by the broken line arrows 191 and 192 respectively. This receiver 128 functions to produce in its output circuit the 510 cycle beat frequency difference between these carrier waves and this 510 cycle signal is supplied through the band pass filter 129b to the rectifier and control tube 130 so as to operate the relay 113 which accordingly operates, as previously indicated, to render the transmitter 112 inoperative and render the receiver 127 operative. In addition, the 510 cycle beat frequency signal is supplied from the band pass filter 129b to the gate circuit 129a thereby rendering the gate circuit conductive, and the 510 cycle beat frequency signal which is also supplied to the input terminals of the gate circuit is thus conducted through the gate to the modulator 115 for modulation on the carrier wave radiated by the transmitter 111.

As soon as the receiver 127 at the transmitting unit 108 is rendered operative, it becomes effective to accept the 1752.00 kilocycle carrier wave radiated by the transmitter 123 and the 1752.600 kilocycle carrier wave radiated by the transmitter 118 at the transmitting unit 110, these carrier waves being respectively represented by the broken line arrows 193 and 194. The receiver 127 functions to produce in its output circuits the 600 cycle beat frequency signal representing the frequency difference between these last mentioned carriers and this 600 cycle signal is supplied through the switch means 131 and the conducting gate 129a to the modulator 115 during the periods when the conducting segment 131a engages the contact 131c for intermittent modulation on the carrier wave radiated by the transmitter 111.

Thus, the wave radiated by the transmitter 111, which is indicated by the broken line arrow 195, extending from the transmitter 111 to the receiver 139 at the mobile receiving unit 107 is continuously modulated with the 510 cycle reference signals and is intermittently modulated with the 600 cycle reference signals. Simultaneously, with the production and transmission of these reference signals, the carrier waves radiated by the transmitters 123 and 118 are radiated to and accepted by the receiver 140 at the mobile receiving unit as represented by the broken line arrows 196 and 197, and the carrier signals respectively radiated by the transmitters 125 and 117 are radiated to and accepted by the receiver 141 at the mobile receiving unit as represented by the broken line arrows 198 and 199 respectively.

At the receiving unit 107, the operation is identical with that described in connection with the first half cycle of operation except that the phase meters 152 and 153 are now operated to provide fine and coarse position indications of the position of the mobile receiving unit 107 relative to the transmitting units 109 and 110. Thus, the 510 cycle and 600 cycle modulation components are reproduced at the receiver 139 and the 510 cycle signal is supplied through the normally open gate circuit 162 to the normally closed gate 164, and at the same time a difference frequency of 510 cycles is produced at the receiver 141, which is supplied through the band pass filter 161 to the control terminals of the normally closed gates 164 and 165 so as to render these gates conductive. The two 510 cycle signals pass through the conducting gates 164 and 165 and the normally open gates 162 and 163 to the phase meter 152 for phase comparison. Thus, a fine or high phase sensitivity position indication is produced having iso-phase lines spaced apart approximately 275 feet. At the same time, the 600 cycle difference frequency signal produced at the receiver 140 is supplied to the mixture 144 which is also supplied from the receiver 141 through the conducting gate 165 with the 510 cycle signal developed at that receiver. At the mixer 144, the two signals are heterodyned to provide a 90 cycle difference frequency position indicating signal which passes through the band pass filter 149 to the phase meter 153. During the periods when the 600 cycle reference signal is being reproduced in the receiver 139, this signal passes through the band pass filter 160 and is effective to render the normally open gates 162 and 163 non-conductive thereby isolating the phase meter 152, and the 510 cycle and 600 cycle are heterodyned in the mixer 143 to provide a 90 cycle reference signal which is supplied through the band pass filter 147 to the phase meter 153. The two 90 cycle signals are thus supplied to the phase meter 153 for phase comparison to provide a coarse position indication of the position of the mobile receiving unit relative to the transmitters 109 and 110 having a low phase sensitivity corresponding to iso-phase lines having a spacing of approximately 10,600 feet.

It will thus be seen that the phase meters 150 and 151 and the phase meters 152 and 153 function alternately to provide fine and coarse position indications at the mobile unit 107 which correspond to two pairs of intersecting sets of iso-phase lines of hyperbolic pattern, one pair comprising a hyperbolic grid in which the iso-phase lines are spaced approximately 280 feet apart along the iso-phase lines of the respective pairs of transmitters, and the other pair comprising similar patterns in which the iso-phase lines are spaced approximately 10,000 feet apart.

As previously indicated in the description of the operation of the switch means 137 at the transmitting unit 110, the switch means 131 at the unit 108 may be operated at any desired speed and the conducting segment 131a should preferably be proportioned to give an on-time to off-time ratio of about 1 to 35. Furthermore, it is not necessary in the system of Figs. 4 and 5 to synchronize the operation of the switch means 131 and 137 either with respect to each other or with respect to the commutator ring 126.

As will be apparent from the above description, the phase meter 151 is operative to compare a pair of 90 cycle signals only during the intervals when both a 330 cycle and a 420 cycle signal are being developed at the receiver 141, but the left hand terminals of the phase meter will be supplied with a 90 cycle signal during the entire period in which the 330 cycle signal from the receiver 139 is effective to render the gate 155 conductive. Accordingly, in order to isolate the phase meter 151 except when operation of the phase meter is desired, it may be desirable to introduce a normally closed gate circuit between the band pass filter 146 and the phase meter 151 and to control this gate circuit from the output of the band pass filter 148. Similarly a normally closed gate circuit may, if desired, be inserted between the band pass filter 149 and the phase meter 153 and controlled from the output of the band pass filter 147.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent is:

1. A wave signal transmission system comprising a pair of spaced transmitting units, a plurality of pairs of transmitters for radiating waves of different frequencies, said transmitters of each pair being respectively disposed at different transmitting units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, means for modulating a first one of said beat frequency signals and said reference signal upon one of said radiated waves, normally closed gate means responsive to one of said beat frequency signals for supplying said first beat frequency signal and said reference signal to said modulating means, and cyclically operating switch means for selectively supplying said first beat frequency signal and said reference signal to said gate means.

2. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, means including normally closed gate means responsive to one of said pair of beat frequency signals for modulating one of said beat frequency signals and said reference signal upon a carrier for space radiation, and cyclically operating switch means for selectively supplying said last mentioned signals to said gate means.

3. A wave signal transmission system comprising a pair of spaced transmitting units, a plurality of pairs of transmitters for radiating waves of different frequencies, said transmitters of each pair being respectively disposed at different transmitting units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, means for modulating a first one of said beat frequency signals and said reference signal upon one of said radiated waves, normally closed gate means responsive to one of said beat frequency signals for supplying said first beat frequency signal and said reference signal to said modulating means, and cyclically operating switch means for selectively supplying said first beat frequency signal and said reference signal to said gate means, said switch means being effective to supply said reference signal to said gate means for only a small fraction of each cycle.

4. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, means including normally closed gate means responsive to one of said pair of beat frequency signals for modulating one of said beat frequency signals and said reference signal upon a carrier for space radiation, and cyclically operating switch means for selectively supplying said last mentioned signals to said gate means, said switch means being effective to supply said reference signal to said gate means for only a small fraction of each cycle.

5. A wave signal transmission system comprising a pair of spaced transmitting units, a plurality of pairs of transmitters for radiating waves of different frequencies, said transmitters of each pair being respectively disposed at different transmitting units, means for intermittently operating the said transmitters at one of said units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, means including normally closed gate means responsive to one of said pair of beat frequency signals for modulating one of said beat frequency signals and said reference signal upon a carrier for space radiaion, and cyclically operating switch means for selectively supplying said last mentioned signals to said gate means.

6. A wave signal transmission system comprising a pair of spaced transmitting units, a plurality of pairs of transmitters for radiating waves of different frequencies, said transmitters of each pair being respectively disposed at different transmitting units, means for intermittently operating the said transmitters at one of said units, a plurality of heterodyning means respectively responsive to pairs of signals derived from said pairs of transmitters to produce beat frequency signals having frequencies respectively related to the beat frequencies between the pairs of waves radiated by said pairs of transmitters, other heterodyning means responsive to said beat frequency signals for producing at least one beat frequency reference signal having a frequency related to the beat frequency between at least one pair of said first mentioned beat frequency signals, means including normally closed gate means responsive to one of said pair of beat frequency signals for modulating one of said beat frequency signals and said reference signal upon a carrier for space radiation, and cyclically operating switch means for selectively supplying said last mentioned signals to said gate means, said switch means being effective to supply said reference signal to said gate means for only a small fraction of each cycle.

7. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to one of said reference signals for supplying said reference signals to said modulating means, and cyclically operating switch means for selectively supplying said first and second reference signals to said gate means.

8. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to said first reference signal for supplying said reference signals to said modulating means, and cyclically operating switch means for selectively supplying said first and second reference signals to said gate means.

9. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to one of said reference signals for supplying said reference signals to said modulating means, and cyclically operating switch means for alternately supplying said first and second reference signals to said gate means.

10. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to said first reference signal for supplying said reference signals to said modulating means, and cyclically operating switch means for alternately supplying said first and second reference signals to said gate means.

11. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to one of said reference signals for supplying said reference signals to said modulating means, and cyclically operating switch means for selectively supplying said first and second reference signals to said gate means, said switch means being effective to supply said second reference signal to said gate means for only a small fraction of each cycle.

12. A wave signal transmitting system comprising at least a pair of transmitting units for radiating waves of different frequencies, means at one of said units for intermittently radiating one of said waves, means at another of said units at least in part responsive to said one wave for developing a first reference signal, means at said other unit for developing a second reference signal, transmitter means at said other unit for radiating another of said waves, means controlled by said first reference signal for rendering said second reference signal means operative and said transmitter means inoperative during intervals when said one wave is being radiated, means for modulating said reference signals upon another wave radiated by said other unit, normally closed gate means responsive to said first reference signal for supplying said reference signals to said modulating means, and cyclically operating switch means for selectively supplying said first and second reference signals to said gate means, said switch means being effective to supply said second reference signal to said gate means for only a small fraction of each cycle.

13. A wave signal transmitting system comprising at least a pair of transmitting units for radiating waves of different frequencies, means at one of said units for intermittently radiating one of said waves, means at another of said units at least in part responsive to said one wave for developing a first beat frequency reference signal, receiver means at said other unit for developing from a pair of said radiated waves a second beat frequency signal, heterodyning means responsive to said first and second beat frequency signals for developing a second reference signal, normally operative transmitter means at said other unit for radiating another of said waves, means controlled by said first reference signal for rendering said receiver means operative and said transmitter means inoperative during intervals when said one wave is being radiated, means for modulating said first and second reference signals upon a common carrier, normally closed gate means responsive to one of said reference signals for supplying said reference signals to said modulating means, and cyclically operating switch means for selectively supplying said first and second reference signals to said gate means.

14. A wave signal transmitting system comprising at least a pair of transmitting units for radiating waves of different frequencies, means at one of said units for intermittently radiating one of said waves, means at another of said units at least in part responsive to said one wave for developing a first beat frequency reference signal, receiver means at said other unit for developing from a pair of said radiated waves a second beat frequency signal, heterodyning means responsive to said first and second beat frequency signals for developing a second reference signal, normally operative transmitter means at said other unit for radiating another of said waves, means controlled by said first reference signal for rendering said receiver means operative and said transmitter means inoperative during intervals when said one wave is being radiated, means for modulating said first and second reference signals upon a common carrier, normally closed gate means responsive to one of said reference signals for supplying said reference signals to said modulating means, and cyclically operating switch means for selectively supplying said first and second reference signals to said gate means, said switch means being effective to supply said second reference signal to said gate means for only a small fraction of each cycle.

15. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals in pairs for producing a pair of position indicating heterodyne signals having frequencies respectively representative of the beat frequency between the beat frequency signals of said pairs, means for receiving and reproducing a plurality of reference signals having frequencies respectively equal to two of said beat frequency signals and said pair of heterodyne signals, a plurality of phase measuring means for measuring the phase relationship between said two beat frequency signals and two of said reference signals of corresponding frequency to provide position indications of one sensitivity and between said heterodyne signals and the other two reference signals of corresponding frequency to provide separate position indications of another sensitivity, and a plurality of normally closed gate means disposed in the input circuits of said phase measuring means and respectively responsive to said reference signals for energizing said phase measuring means with signals of matching frequency for phase comparison.

16. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, means for receiving and reproducing first and second reference signals having frequencies respectively equal to the frequencies of said first and second heterodyne signals, phase measuring means for respectively measuring the phase relationship between corresponding heterodyne and reference signals to provide separate position indications of different sensitivity, normally closed gate means responsive to said first reference signal for supplying said first heterodyne and reference signals to one of said phase measuring means, and normally closed gate means responsive to said second reference signal for supplying said second heterodyne and reference signals to a second of said phase measuring means.

17. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, said first beat frequency signal constituting a first position-indicating heterodyne signal, heterodyning means responsive to said first and second beat frequency signals for producing a second position-indicating heterodyne signal having a frequency representative of the beat frequency between said first and second beat frequency signals and having a phase sensitivity different from that of said first heterodyne signal, means for receiving and reproducing first and second reference signals modulated upon a common carrier wave and having frequencies respectively equal to the frequencies of said first and second heterodyne signals, said second reference signal being in the form of short pulses the duration of which bears the same ratio to the time between pulses as the ratio between the phase sensitivites of said first and second heterodyne signals, phase measuring means for respectively measuring the phase relationship between corresponding heterodyne and reference signals to provide separate position indications of different sensitivity, normally closed gate means responsive to said first reference signal for supplying said first heterodyne and reference signals to one of said phase measuring means, and normally closed gate means responsive to said second reference signal for supplying said second heterodyne and reference signals to a second of said phase measuring means only during said pulses of said second reference signal, whereby said phase measuring means operate at substantially equal speeds to provide fine and coarse position indications.

18. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal, other heterodyne means responsive to said second position indicating signal and said fourth heterodyne signal for producing a fourth position indicating signal, said first receiver being operative when said third receiver is receiving said fourth pair of waves to receive and reproduce first and second reference signals modulated on a common carrier and respectively having frequencies equaling the frequencies of said second and fourth position indicating signals, said second receiver being operative when said third receiver is receiving said third pair of waves to receive and reproduce third and fourth reference signals modulated on a common carrier and respectively having frequencies equaling the frequencies of said first and third position indicating signals, whereby four pairs of matching-frequency reference and position indicating signals are alternately produced in sets of two, a plurality of phase measuring means for respectively measuring the phase relationship between said matching frequency pairs, normally closed gate means coupled to the input circuits of each of said phase measuring means for normally isolating said phase measuring means, said gate means being respectively responsive to said reference signals for supplying said matching signals to said phase measuring means for phase comparison.

19. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal having a phase sensitivity different than the phase sensitivity of said first position indicating signal, other heterodyne means responsive to said second position indicating signal and said fourth heterodyne signal for producing a fourth position indicating signal having a phase sensitivity different than the phase sensitivity of said second position indicating signal, said first receiver being operative when said third receiver is receiving said fourth pair of waves to receive and reproduce first and second reference signals modulated on a common carrier and respectively having frequencies equaling the frequencies of said second and fourth position indicating signals, said second receiver being operative when said third receiver is receiving said third pair of waves to receive and reproduce third and fourth reference signals modulated on a common carrier and respectively having frequencies equaling the frequencies of said first and third position indicating signals, whereby four pairs of matching frequency reference and position indicating signals are alternately produced in sets of two, the two pairs of signals constituting each set having different phase sensitivities, a plurality of phase measuring means for respectively measuring the phase relationship between said matching frequency pairs, normally closed gate means coupled to the input circuits of each of said phase measuring means for normally isolating said phase measuring means, said gate means being respectively responsive to said reference signals for supplying said matching signals to said phase measuring means for phase comparison.

20. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal having a phase sensitivity different than the phase sensitivity of said first position indicating signal, other heterodyne means responsive to said second position indicating signal and said fourth heterodyne signal for producing a fourth position indicating signal having a phase sensitivity different than the phase sensitivity of said second position indicating signal, said first receiver being operative when said third receiver is receiving said fourth pair of waves to receive and reproduce first and second reference signals modulated on a common carrier and respectively having frequencies equaling the frequencies of said second and fourth position indicating signals, said second receiver being operative when said third receiver is receiving said third pair of waves to receive and reproduce third and fourth reference signals modulated on a common carrier and respectively having frequencies equaling the frequencies of said first and third position indicating signals, whereby four pairs of matching frequency reference and position indicating signals are alternately produced in sets of two, the two pairs of signals constituting each set having different phase sensitivities, said second and fourth reference signals being in the form of short pulses having a duration which bears the same relation to the time between pulses as the ratio between the phase sensitivities of said matching frequency pairs, a plurality of phase measuring means for respectively measuring the phase relationship between said matching frequency pairs, normally closed gate means coupled to the input circuits of each of said phase measuring means for normally isolating said phase measuring means, said gate means being respectively responsive to said reference signals for supplying said matching signals to said phase measuring means for phase comparison.

21. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal, other heterodyne means responsive to said second position indicating signal and said fourth heterodyne signal for producing a fourth position indicating signal, said first receiver being operative when said third receiver is receiving said fourth pair of waves to receive and reproduce first and second reference signals modulated on a common carrier and respectively having frequencies equaling the frequencies of said second and fourth position indicating signals, said second receiver being operative when said third receiver is receiving said third pair of waves to receive and reproduce third and fourth reference signals modulated on a common carrier and respectively having frequencies equaling the frequencies of said first and third position indicating signals, whereby four pairs of matching frequency reference and position indicating signals are alternately produced in sets of two, a pair of phase measuring means for respectively measuring the phase relationship between said first position indicating signal and said third reference signal and between said third position indicating signal, and said fourth reference signal to produce two indications of the position of said receiving apparatus relative to the source of one of said waves, a second pair of phase measuring means for respectively measuring the phase relationship between said second position indicating signal and said first reference signal and between said fourth position indicating signal and said second reference signal to produce two indications of the position of said receiving apparatus relative to the source of another of said waves, normally closed gate means coupled to the input circuits of each of said phase measuring means for normally isolating said phase measuring means, said gate means being respectively responsive to said reference signals for supplying said matching signals to said phase measuring means for phase comparison.

22. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal having a phase sensitivity different than the phase sensitivity of said first position indicating signal, other heterodyne means responsive to said second position indicating signal and said fourth heterodyne signal for producing a fourth position indicating signal having a phase sensitivity different than the phase sensitivity of said second position indicating signal, said first receiver being operative when said third receiver is receiving said fourth pair of waves to receive and reproduce first and second reference signals modulated on a common carrier and respectively having frequencies equaling the frequencies of said second and fourth position indicating signals, said second receiver being operative when said third receiver is receiving said third pair of waves to receive and reproduce third and fourth reference signals modulated on a common carrier and respectively having frequencies equaling the frequencies of said first and third position indicating signals, whereby four pairs of matching frequency reference and position indicating signals are alternately produced in sets of two, the two pairs of signals constituting each set having different phase sensitivities, a pair of phase measuring means for respectively measuring the phase relationship between said first position indicating signal and said third reference signal and between said third position indicating signal and said fourth reference signal to produce two indications of different sensitivity of the position of said receiving apparatus relative to the source of one of said waves, a second pair of phase measuring means for respectively measuring the phase relationship between said second position indicating signal and said first reference signal and between said fourth position indicating signal and said second reference signal to produce two indications of different sensitivity of the position of said receiving apparatus relative to the source of another of said waves, normally closed gate means coupled to the input circuits of each of said phase measuring means for normally isolating said phase measuring means, said gate means being respectively responsive to said reference signals for supplying said matching signals to said phase measuring means for phase comparison.

23. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and said third heterodyne signal for producing a third position indicating signal having a phase sensitivity different than the phase sensitivity of said first position indicating signal, other heterodyne means responsive to said second position indicating signal and said fourth heterodyne signal for producing a fourth position indicating signal having a phase sensitivity different than the phase sensitivity of said second position indicating signal, said first receiver being operative when said third receiver is receiving said fourth pair of waves to receive and reproduce pulsed first and second reference signals alternately modulated on a common carrier and respectively having frequencies equaling the frequencies of said second and fourth position indicating signals, said second receiver being operative when said third receiver is receiving said third pair of waves to receive and reproduce pulsed third and fourth reference signals alternately modulated on a common carrier and respectively having frequencies equaling the frequencies of said first and third position indicating signals, whereby four pairs of matching frequency reference and position indicating signals are alternately produced in sets of two, the two pairs of signals constituting each set having different phase sensitivities, said second and fourth reference signals having pulse durations which respectively bear to the pulse durations of said first and third reference signals the same ratios as the phase sensitivities of said matching frequency pairs of each set, a pair of phase measuring means for respectively measuring the phase relationship between said first position indicating signal and said third reference signal and between said third position indicating signal and said fourth reference signal to produce two indications of different sensitivity of the position of said receiving apparatus relative to the source of one of said waves, a second pair of phase measuring means for respectively measuring the phase relationship between said second position indicating signal and said first reference signal and between said fourth position indicating signal and said second reference signal to produce two indications of different sensitivity of the position of said receiving apparatus relative to the source of another of said waves, normally closed gate means coupled to the input circuits of each of said phase measuring means for normally isolating said phase measuring means, said gate means being respectively responsive to said reference signals for supplying said matching signals to said phase measuring means for phase comparison only during said pulses, whereby said phase measuring means operate at substantially the same speeds to provide two sets of fine and coarse position indications.

24. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and one of said heterodyne signals for producing a third position indicating signal, other heterodyne means responsive to said second position indicating signal and the other of said heterodyne signals for producing a fourth position indicating signal, said first receiver being operative when said third receiver is receiving said fourth pair of waves to receive and reproduce a first pair of signals modulated on a common carrier, one of said pair of signals constituting a first reference signal having a frequency equaling the frequency of said second position indicating signal, the second of said first pair of signals having a frequency equaling said difference frequency of said fourth pair of waves, said second receiver being operative when said third receiver is receiving said third pair of waves to receive and reproduce a second pair of signals modulated on another common carrier, one of said second pair of signals constituting a second reference signal having a frequency equaling the frequency of said first position indicating signal, the second of said second pair of signals having a frequency equaling said difference frequency between said third pair of waves, heterodyning means respectively responsive to said first and second pairs of modulated signals for producing third and fourth reference signals having frequencies respectively equaling the frequencies of said third and fourth position indicating signals, whereby four pairs of matching-frequency reference and position indicating signals are alternately produced in sets of two, said second modulation signal of each of said first and second pairs, and consequently said third and fourth reference signals being in the form of pulses the duration of which is small compared to the pulse frequency, a plurality of phase measuring means for respectively measuring the phase relationships between said matching-frequency signals, normally closed gate means respectively responsive to said first and second position indicating signals coupled to the output circuits of said first and second receivers for isolating certain of said phase measuring means from said receiver output circuits except during intervals when said first and second position indicating signals are being produced, and normally open gate means connected in series with said normally closed gate means and respectively responsive to said modulation signals respectively reproduced by said second and first receivers for isolating said last mentioned phase measuring means during said pulses.

25. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves and having a given phase sensitivity, a second receiver for receiving and heterodyning a second pair of radiated waves to produce a second position indicating signal having a frequency related to the difference frequency between said second pair of waves and having a given phase sensitivity, a third receiver alternately operative to receive and heterodyne third and fourth pairs of waves to produce heterodyne signals having frequencies respectively related to the difference frequencies of said third and fourth pairs, heterodyne means responsive to said first position indicating signal and one of said heterodyne signals for producing a third position indicating signal having a phase sensitivity different than the phase sensitivity of said first position indicating signal, other heterodyne means responsive to said second position indicating signal and the other of fourth heterodyne signals for producing a fourth position indicating signal having a phase sensitivity different than the phase sensitivity of said second position indicating signal, said first receiver being operative when said third receiver is receiving said fourth pair of waves to receive and reproduce a first pair of signals modulated on a common carrier, one of said pair of signals constituting a first reference signal having a frequency equaling the frequency of said second position indicating signal, the second of said first pair of signals having a frequency equaling said difference frequency of said fourth pair of waves, said second receiver being operative when said third receiver is receiving said third pair of waves to receive and reproduce a second pair of signals modulated on another common carrier, one of said second pair of signals constituting a second reference signal having a frequency equaling the frequency of said first position indicating signal, the second of said second pair of signals having a frequency equaling said difference frequency between said third pair of waves, heterodyning means respectively responsive to said first and second pairs of modulated signals for producing third and fourth reference signals having frequencies respectively equaling the frequencies of said third and fourth position indicating signals, whereby four pairs of matching-frequency reference and position indicating signals are alternately produced in sets of two, the position indicating signals of each set having different phase sensitivities, said second modulation signal of each of said first and second pairs, and consequently said third and fourth reference signals being in the form of pulses the duration of which bears the same ratio to the pulse frequency as the ratio between the phase sensitivities of the corresponding set of position indicating signals, a plurality of phase measuring means for respectively measuring the phase relationships between said matching-frequency signals, normally closed gate means respectively responsive to said first and second position indicating signals coupled to the output circuits of said first and second receivers for isolating certain of said phase measuring means from said receiver output circuit except during intervals when said first and second position indicating signals are being produced, and normally open gate means connected in series with said normally closed gate means and respectively responsive to said modulation signals respectively reproduced by said second and first receivers for isolating said last mentioned phase measuring means during said pulses.

26. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves, a second receiver for receiving and heterodyning a second pair of radiated waves to produce a second position indicating signal having a frequency related to the difference frequency between said second pair of waves, a third receiver alternately operative to receive and heterodyne third and fourth pairs of waves to produce heterodyne signals having frequencies respectively related to the difference frequencies of said third and fourth pairs, heterodyne means responsive to said first position indicating signal and one of said heterodyne signals for producing a third position indicating signal, other heterodyne means responsive to said second position indicating signal and the other of said heterodyne signals for producing a fourth position indicating signal, said first receiver being operative when said third receiver is receiving said fourth pair of waves to receive and reproduce a first pair of signals modulated on a common carrier, one of said pair of signals constituting a first reference signal having a frequency equaling the frequency of said second position indicating signal, the second of said first pair of signals having a frequency equaling said difference frequency of said fourth pair of waves, said second receiver being operative when said third receiver is receiving said third pair of waves to receive and reproduce a second pair of signals modulated on another common carrier, one of said second pair of signals constituting a second reference signal having a frequency equaling the frequency of said first position indicating signal, the second of said second pair of signals having a frequency equaling said difference frequency between said third pair of waves, heterodyning means respectively responsive to said first and second pairs of modulated signals for producing third and fourth reference signals having frequencies respectively equaling the frequencies of said third and fourth position indicating signals, whereby four pairs of matching-frequency reference and position indicating signals are alternately produced in sets of two, said second modulation signal of each of said first and second pairs, and consequently said third and fourth reference signals being in the form of pulses the duration of which is small compared to the pulse frequency, a plurality of phase measuring means for respectively measuring the phase relationships between said matching-frequency signals, normally closed gate means respectively responsive to said first and second position indicating signals coupled to the output circuits of said first and second receivers for isolating certain of said phase measuring means from said receiver output circuit except during intervals when said first and second position indicating signals are being produced, normally open gate means connected in series with said normally closed gate means and respectively responsive to said modulation signals respectively reproduced by said second and first receivers for isolating said last mentioned phase measuring means during said pulses, and filter means respectively tuned to said third and fourth, position indicating and reference signals connected between said heterodyne means and others of said phase measuring means for selectively rendering said last mentioned phase measuring means operative.

27. A wave signal receiving apparatus for translating received space radiated waves into position indications, comprising a first receiver for receiving a first pair of space radiated waves and for heterodyning said waves to produce a first position indicating signal having a frequency related to the difference frequency between said pair of waves and having a given phase sensitivity, a second receiver for receiving and heterodyning a second pair of radiated waves to produce a second position indicating signal having a frequency related to the difference frequency between said second pair of waves and having a given phase sensitivity, a third receiver alternately operative to receive and heterodyne third and fourth pairs of waves to produce heterodyne signals having frequencies respectively related to the difference frequencies of said third and fourth pairs, heterodyne means responsive to said first position indicating signal and one of said heterodyne signals for producing a third position indicating signal having a phase sensitivity different than the phase sensitivity of said first position indicating signal, other heterodyne means responsive to said second position indicating signal and the other of said heterodyne signals for producing a fourth position indicating signal having a phase sensitivity different than the phase sensitivity of said second position indicating signal, said first receiver being operative when said third receiver is receiving said fourth pair of waves to receive and reproduce a pair of signals modulated on a common carrier, one of said pair of signals constituting a first reference signal having a frequency equaling the frequency of said second position indicating signal, the second of said first pair of signals having a frequency equaling said difference frequency of said fourth pair of waves, said second receiver being operative when said third receiver is receiving said third pair of waves to receive and reproduce a second pair of signals modulated on another common carrier, one of said second pair of signals constituting a second reference signal having a frequency equaling the frequency of said first position indicating signal, the second of said second pair of signals having a frequency equaling said difference frequency between said third pair of waves, heterodyning means respectively responsive to said first and second pairs of modulated signals for producing third and fourth reference signals having frequencies respectively equaling the frequencies of said third and fourth position indicating signals, whereby four pairs of matching frequency reference and position indicating signals are alternately produced in sets of two, the position indicating signals of each set having different phase sensitivities, said second modulation signal of each of said first and second pairs, and consequently said third and fourth reference signals being in the form of pulses the duration of which bears the same ratio to the pulse frequency as the ratio between the phase sensitivities of the corresponding set of position indicating signals, a plurality of phase measuring means for respectively measuring the phase relationships between said matching-frequency signals, normally closed gate means respectively responsive to said first and second position indicating signals coupled to the output circuits of said first and second receivers for isolating certain of said phase measuring means from said receiver output circuit except during intervals when said first and second position indicating signals are being produced, normally open gate means connected in series with said normally closed gate means and respectively responsive to said modulation signals respectively reproduced by said second and first receivers for isolating said last mentioned phase measuring means during said pulses, and filter means respectively tuned to said third and fourth position indicating and reference signals connected between said heterodyne means and others of said phase measuring means for selectively rendering said last mentioned phase measuring means operative.

28. Wave signal receiving apparatus for translating received space radiated waves into position indications comprising a receiver for receiving a first pair of space radiated waves and for heterodyning said waves to produce a first beat frequency signal, said receiver being alternately operable to receive and reproduce a first reference signal modulated upon one of said first pair of radiated waves, a second receiver for receiving and heterodyning a second pair of radiated waves to produce a second beat frequency signal, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals, and a plurality of normally closed gate means responsive to said first and second reference signals for selectively rendering said phase measuring means operative.

29. Wave signal receiving apparatus for translating received space radiated waves into position indications comprising a receiver for receiving a first pair of space radiated waves and for heterodyning said waves to produce a first beat frequency signal having a frequency related to the difference frequency between said waves, said receiver being alternately operable to receive and reproduce a first reference signal modulated upon one of said first pair of radiated waves, a second receiver for receiving and heterodyning a second pair of radiated waves to produce a second beat frequency signal having a frequency related to the difference frequency between said second pair of waves, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals having frequencies respectively related to the difference frequencies between said third and fourth pairs of waves, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals, and a plurality of normally closed gate means responsive to said first and second reference signals for selectively rendering said phase measuring means operative.

30. In a position determining system having a receiving point, a plurality of spaced transmitters for radiating position signals, means for sequentially modulating the signals radiated by each of said transmitters with a plurality of reference signals of different frequencies, said modulating means including normally closed gate means responsive to one of said reference signals, and receiving and translating apparatus at said receiving point jointly responsive to said position indicating and reference signals for producing at least two indications respectively representative of the position of said receiving point relative to different ones of said transmitters.

31. In a position determining system having a receiving point, a plurality of spaced transmitters, a transmitting unit spaced from each of said transmitters and including means for sequentially radiating position indicating signals, means at least in part responsive to said signals for rendering at least one of said transmitters successively operative to transmit a position indicating signal and a plurality of reference signals of different frequencies, said last mentioned means including normally closed gate means responsive to one of said reference signals, and receiving and translating apparatus at said receiving point jointly responsive to said position indicating and reference signals for producing at least two indications respectively representative of the position of said receiving point relative to different ones of said transmitters.

32. In a position determining system having a receiving point, a plurality of spaced transmitters continuously operative to radiate distinguishable position indicating signals, additional transmitting apparatus spaced from each of said transmitters and including means for sequentially radiating other position indicating signals, means at least in part responsive to said last named signals for intermittently modulating the signals radiated by each of said transmitters with a plurality of different reference signals, said last mentioned means including normally closed gate means responsive to one of said reference signals, and receiving and translating apparatus at said receiving point jointly responsive to said position indicating and reference signals for producing two indications respectively representative of the position of said receiving point relative to different ones of said transmitters.

33. In a position determining system having a receiving point, a plurality of spaced transmitters for radiating position signals, means for sequentially modulating the signals radiated by each of said transmitters with a plurality of reference signals of different frequencies, and receiving and translating apparatus at said receiving point jointly responsive to said position indicating and reference signals for producing at least two indications respectively representative of the position of said receiving point relative to different ones of said transmitters.

34. In a position determining system having a receiving point, a plurality of spaced transmitters, a transmitting unit spaced from each of said transmitters and including means for sequentially radiating position indicating signals, means at least in part responsive to said signals for rendering at least one of said transmitters successively operative to transmit a position indicating signal and a plurality of reference signals of different frequencies, and receiving and translating apparatus at said receiving point jointly responsive to said position indicating and reference signals for producing at least two indications respectively representative of the position of said receiving point relative to different ones of said transmitters.

35. In a position determining system having a receiving point, a plurality of spaced transmitters continuously operative to radiate distinguishable position indicating signals, additional transmitting apparatus spaced from each of said transmitters and including means for sequentially radiating other position indicating signals, means at least in part responsive to said last named signals for intermittently modulating the signals radiated by each of said transmitters with a plurality of different reference signals, and receiving and translating apparatus at said receiving point jointly responsive to said position indicating and reference signals for producing two indications respectively representative of the position of said receiving point relative to different ones of said transmitters.

JAMES E. HAWKINS.

References Cited in the file of this patent

UNITED STATES PATENTS

| Number | Name | Date |
|---|---|---|
| 2,148,267 | Honore | Feb. 21, 1939 |
| 2,513,318 | Hawkins et al. | July 4, 1950 |
| 2,513,321 | Hawkins | July 4, 1950 |